United States Patent
Rooney et al.

(10) Patent No.: US 11,163,752 B2
(45) Date of Patent: Nov. 2, 2021

(54) GLOBAL COHERENCY FOR DISTRIBUTED DATA SOURCES

(71) Applicant: International Business Machines Corporation, Armonk, NY (US)

(72) Inventors: John G. Rooney, Zurich (CH); Daniel Nikolaus Bauer, Birmensdorf (CH); Luis Garcés Erice, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 16/686,356

(22) Filed: Nov. 18, 2019

(65) Prior Publication Data

US 2021/0149872 A1  May 20, 2021

(51) Int. Cl.
| | |
|---|---|
| *G06F 11/00* | (2006.01) |
| *G06F 16/23* | (2019.01) |
| *G06F 16/18* | (2019.01) |
| *G06F 16/28* | (2019.01) |

(52) U.S. Cl.
CPC ...... *G06F 16/2365* (2019.01); *G06F 16/1805* (2019.01); *G06F 16/284* (2019.01)

(58) Field of Classification Search
CPC ........ G06F 16/13; G06F 16/24; G06F 16/156; G06F 11/08; G06N 3/00; G06N 5/00; G05B 13/00

See application file for complete search history.

(56) References Cited

U.S. PATENT DOCUMENTS

| | | | | |
|---|---|---|---|---|
| 2013/0267792 | A1* | 10/2013 | Petersen | G16H 50/70 600/301 |
| 2015/0199410 | A1* | 7/2015 | Redlich | G06F 16/93 726/27 |
| 2018/0121453 | A1* | 5/2018 | Jain | G06F 11/1448 |
| 2018/0336133 | A1* | 11/2018 | Turner | G06F 12/0815 |
| 2019/0042425 | A1* | 2/2019 | Shifer | G06F 12/084 |
| 2019/0171650 | A1* | 6/2019 | Botev | G06F 16/2379 |

FOREIGN PATENT DOCUMENTS

| | | |
|---|---|---|
| EP | 2435919 B1 | 12/2017 |
| WO | 2014065802 A2 | 5/2014 |

OTHER PUBLICATIONS

Kreps et al., Kafka: a Distributed Messaging System for Log Processing, 2011.*

* cited by examiner

*Primary Examiner* — Hung D Le
(74) *Attorney, Agent, or Firm* — David B. Woycechowsky

(57) ABSTRACT

A computer implemented method for enabling data coherency between a first data source and a second data source of different structure may be provided. The first data source has a first format and a related first log file. Similar conditions apply to the second data source. The method comprises also determining a first entry in the first log file at which the data have a semantic consistency and storing this as first read barrier. The same applies for an entry in the second data source. Additionally, the method comprises building a third data set derived from data of the first data source and data of the second data source and being coherent with them, using data from the first data source up to the first read barrier and data from the second data source up to the second read barrier.

20 Claims, 5 Drawing Sheets

GLOBAL COHERENCY FOR DISTRIBUTED DATA SOURCES

BACKGROUND

Large enterprises are divided, both geographically and organizationally. Different parts of the enterprise may maintain different data sets. For example, sales may keep sales figures, marketing may maintain marketing data, manufacturing may maintain manufacturing and quality data, and logistics and warehouse systems may maintain data related to its best purpose. One may denote a unit of data that is maintained and updated independently of others such as a data asset or data set.

Different data sets and data assets may be combined in order to create derived data assets. For example, weather forecasts may be combined with supply chain data to make predictions about likely disruptions.

Depending on the computation engine used to create these derived data assets, the data may be replicated from the location at which they are maintained to a different location where the computation is actually performed. These derived data assets make themselves be used to create further derived data assets. The set of data assets in an enterprise can also be viewed as directed acyclic graph (DAG), wherein the nodes are data sets and the directed edges of the dependencies. Data assets without entering edges are raw data sources, while data assets with one or more edges are derived once.

Raw data assets are updated at some frequency, for example, in real time as each new sale logged by the sales department. Derived data assets may be updated at a different frequency, for example, once a day in order to create new sales recommendations.

SUMMARY

According to one aspect of the present invention, a computer implemented method for enabling data coherency between a first data source and a second data source may be provided. The first and the second data source may have different structures. The method may comprise providing a first data source of a first format and a related first log file, providing a second data source of a second format and a related second log file, determining a first entry in the first log file at which the data in the first data source has a semantic inconsistency (note: a semantic inconsistency is herein used synonymously with the term ("semantic consistency"), and storing the first entry as a first read barrier.

Additionally, the method may comprise determining a second entry in the second log file at which the data in the second data source has a semantic consistency, storing the second entry as a second read barrier, and building a third data set derived from data of the first data source and data of the second data source and being coherent with both of them, This uses data from the first data source up to the first read barrier and data from the second data source up to the second read barrier.

According to another aspect of the present invention, a data coherence system for enabling data coherency between a first data source and a second data source may be provided. The first and the second data sources have different structures. The system may comprise a first data source of a first format and a related first log file, a second data source of a second format and a related second log file. This is a means for determining a first entry in the first log file at which the data in the first data source has a semantic consistency, and a means for storing the first entry as a first read barrier.

Furthermore, the system may comprise a means for determining a second entry in the second log file at which the data in the second data source has a semantic consistency, a means for storing the second entry as a second read barrier, and a means for building a third data set derived from data of the first data source and data of the second data source and being coherent with both of them. This uses data from the first data source up to the first read barrier and data from the second data source up to the second read barrier.

Furthermore, embodiments may take the form of a related computer program product, accessible from a computer usable or computer readable medium providing program code for use, by, or in connection, with a computer or any instruction execution system. For the purpose of this description, a computer usable or computer readable medium may be any apparatus that may contain means for storing, communicating, propagating or transporting the program for use, by, or in connection, with the instruction execution system, apparatus, or device.

According to an aspect of the present invention, there is a method, computer program product and/or system establishing data coherency between a first data source and a second data source, with the first and the second data source have different structures, that performs the following operations (not necessarily in the following order): (i) providing a first data source of a first format and a related first log file; (ii) providing a second data source of a second format and a related second log file; (iii) determining a first entry in the first log file where there is a semantic consistency between the first data source and the first entry of the first log file: (iv) storing the first entry as a first read barrier; (v) determining a second entry in the second log file where there is a semantic consistency between the second data source and the second entry of the second log file; (vi) storing the second entry as a second read barrier, and (vii) building a third data set derived from data of the first data source and data of the second data source, and being coherent with them, using data from the first data source up to the first read barrier and data from the second data source up to the second read barrier.

According to a further aspect of the present invention, a data coherence system enables data coherency between a first data source and a second data source, wherein the first and the second data source have different structures. The data coherence system includes: (i) first data source of a first format and a related first log file; (ii) second data source of a second format and a related second log file; (iii) means for determining a first entry in the first log file at which the data in the first data source have a semantic consistency; (iv) means for storing the first entry as a first read barrier; (v) a means for determining a second entry in the second log file at which the data in the second data source have a semantic consistency; (vi) means for storing the second entry as a second read barrier, and (vii) means for building a third data set derived from data of the first data source and data of the second data source, and being coherent with them, using data from the first data source up to the first read barrier and data from the second data source up to the second read barrier.

BRIEF DESCRIPTION OF THE DRAWINGS

It should be noted that some embodiments of the invention are described with reference to different subject matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject matter, also any combination between features relating to different subject matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
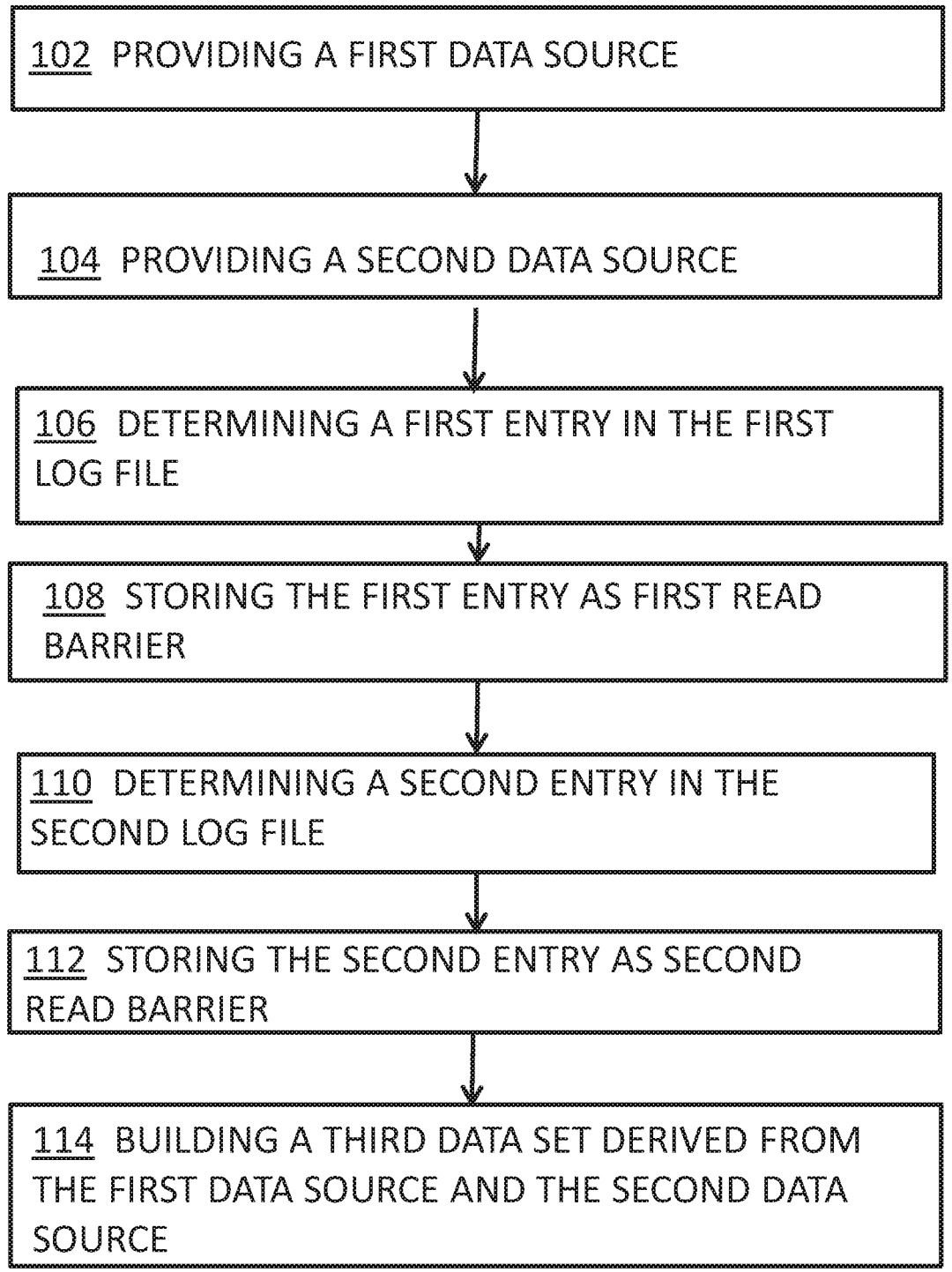

Preferred embodiments of the invention will be described, by way of example only, and with reference to the following drawings:

FIG. 1 shows a block diagram of an embodiment of the inventive computer implemented method for enabling data coherency between a first data source and a second data source.

Figure 2:
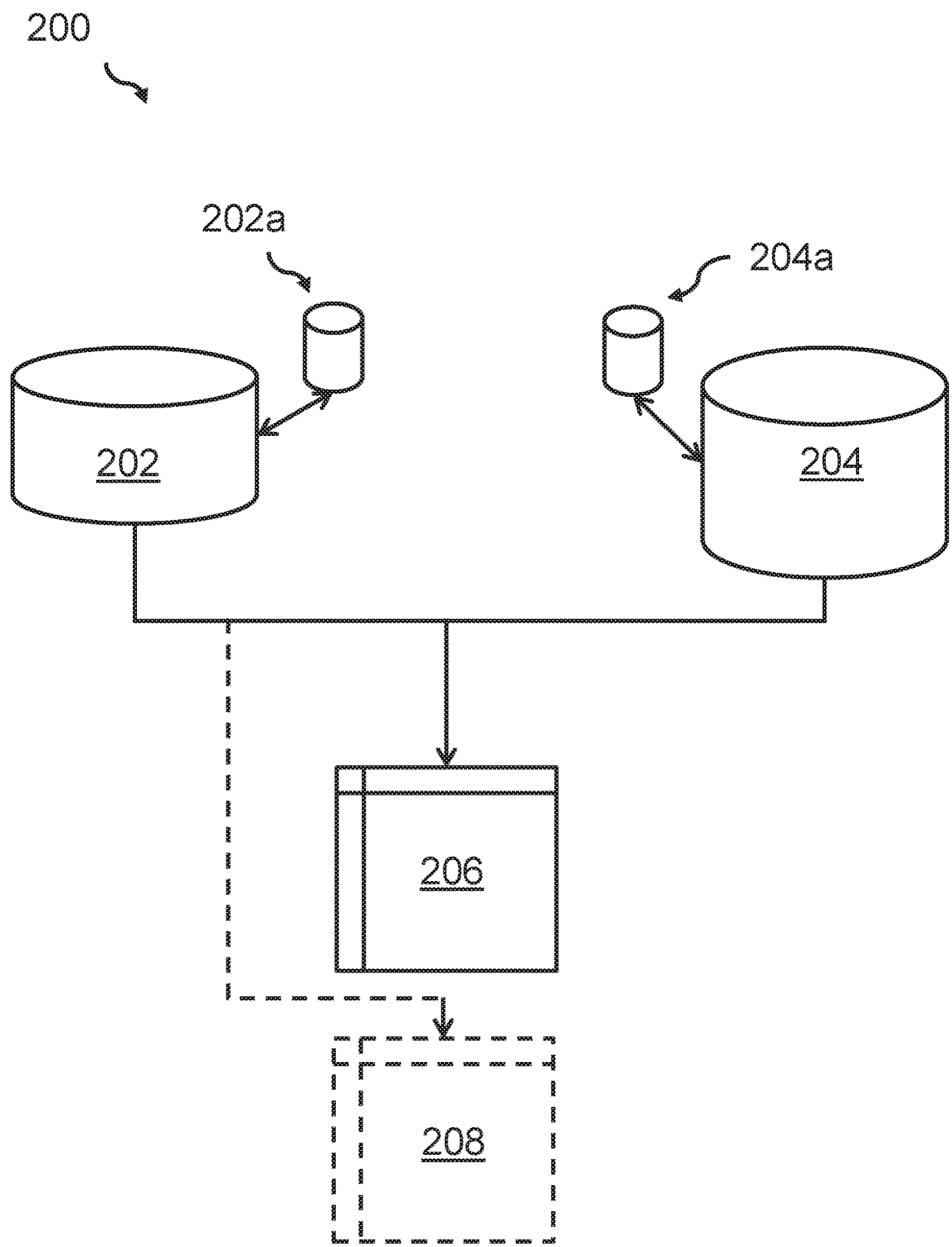

FIG. 2 shows a block diagram of two data sources combined to a third data source (also sometimes referred to as a third data set).

Figure 3:
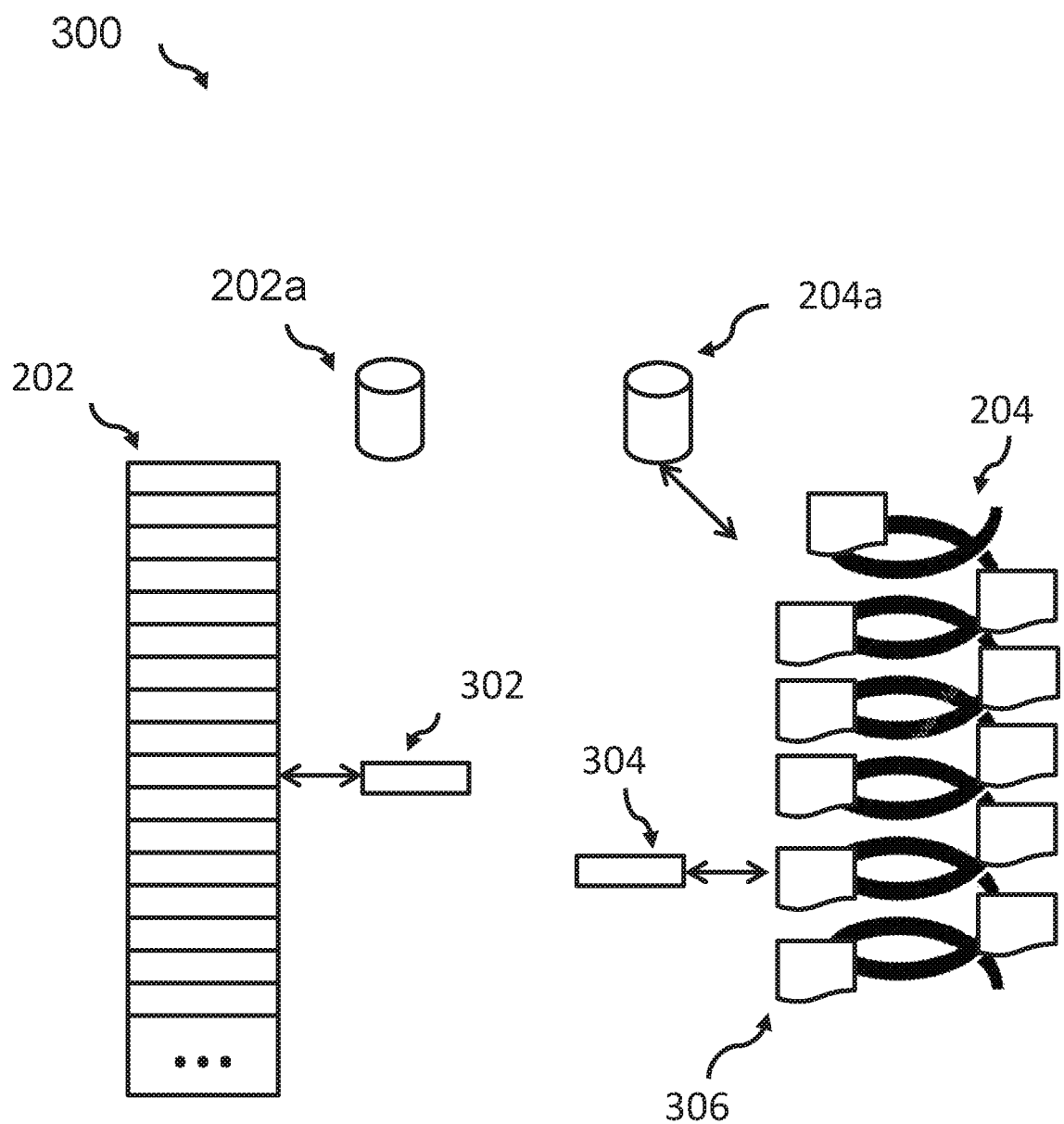

FIG. 3 shows a block diagram of the two data sources having a different structure with related read barriers.

Figure 4:
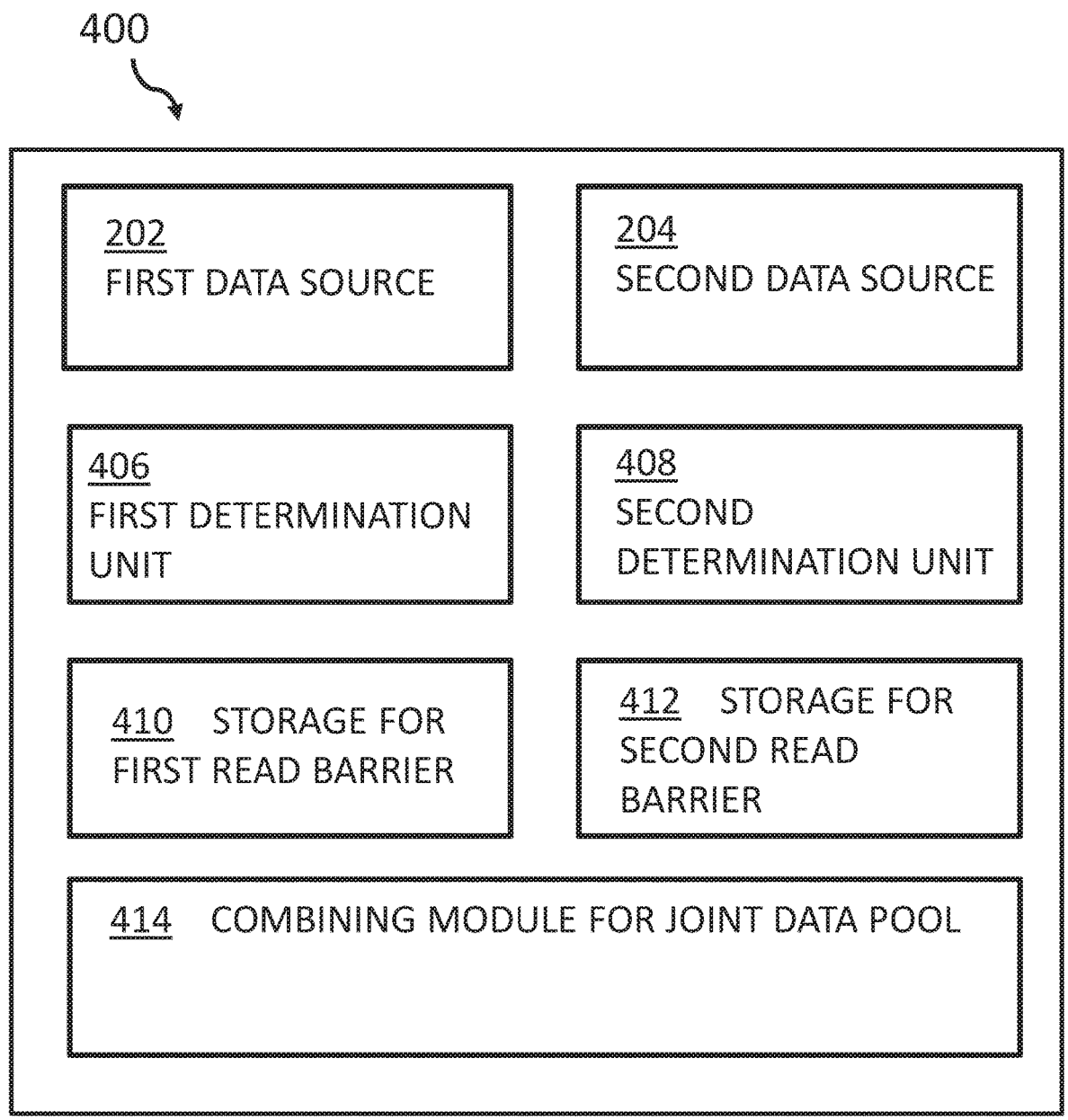

FIG. 4 shows an embodiment of the data coherence system for enabling data coherency between a first data source and a second data source.

Figure 5:
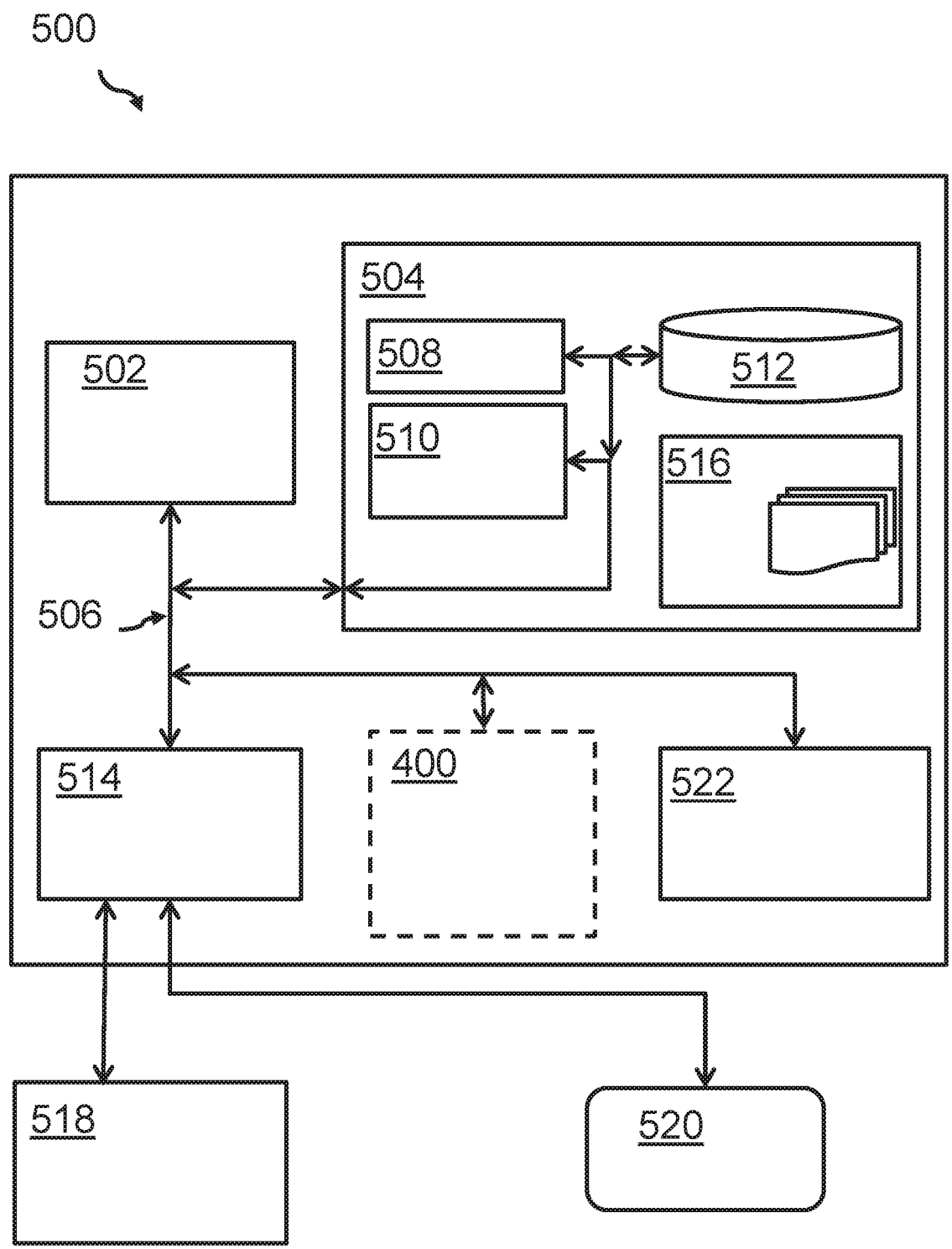

FIG. 5 shows an embodiment of a computing system comprising the data coherence system according to FIG. 4.

DETAILED DESCRIPTION

Some embodiments of the present invention recognize the following facts, potential problems and/or potential areas for improvement in with respect to the current state of the art: (i) not all data assets are updated simultaneously; (ii) there may consequently be a problem of coherency between different data assets and data sets; (iii) data sources' content can be better aligned than under the current state of the art; and and/or (iv) a computer implemented method can facilitate data coherency between a first data source and a second data source.

A computer implemented method for enabling data coherency between a first data source and a second data source of different structure may be provided. The first data source has a first format and a related first log file. Similar conditions apply to the second data source. The method comprises also determining a first entry in the first log file at which the data have a semantic consistency and storing this as first read barrier. The same applies for an entry in the second data source. Additionally, the method comprises building a third data set derived from data of the first data source and data of the second data source and being coherent with them, using data from the first data source up to the first read barrier and data from the second data source up to the second read barrier.

In the context of this description, the following conventions, terms and/or expressions may be used:

The term 'data coherency' may denote a semantic alignment of data in different data sources which may be organized in different ways (for example, not remote copies or backups). Each of the data sources may be consistent in itself, that is, without data contradictions. Thus, a status of the data source may be reliable re-created from log file data and time stamps at a later point in time. For this reason, the log file and the respective read barriers may be instrumental.

The term 'first data source' may denote a raw data set or a derived data asset (derived from a raw data set or from a derived data set) organized in any kind of data storage system, for example, a relational database, a flat file system, and object database, a NoSQL database, etc. The same may apply to the term 'second data source'. The organization of the data and the first data source and the second data source may be different. However, the proposed concept may also work if the data organization and the different data sources are identical.

The term 'different structure' may denote that the kind of storage is not identical with the first data source and the second data source. The kind of storage may be, for example, a relational structure with tables and rows, as binary large objects, or any other kind of data organization.

The term 'log file' may denote a file which may record (that is, store events or transaction details in a storage system for each single transaction). Thus, starting from a specific status of a database table, one may re-create in an earlier status of the same database table if the recorded events or transactions are used to stepwise go back in time. That is, a rollback operation may be performed on the specific database table using the entries in the log file and a reverse order. The same principle may be applied to data organized differently.

The term 'read barrier' may denote a specific log file entry or value (for example, a time stamp) indicative of a stable and consistent status of at least parts of a data source, for example, a database or other kind of data storage. That is, different tables in a relational database may be aligned to each other and a transaction (or a plurality of transactions) has been finalized. The read barrier may also denote a pointer pointing to the specific log file entry. A special reader may be instrumented to read up to a read barrier in order to deliver a consistent view a data of a data source.

The term 'semantic consistency' may denote that no open transactions exist in a data storage for a data set or data asset and that old partial elements of the data set/asset build "a meaningful whole", that is, have a defined and consistent, re-creatable status.

The term 'Hadoop file system' may denote the known collection of open source software utilities that facilitate using a network of minicomputers to solve problems involving massive amounts of data and computation. It provides a software framework for distributed storage and processing of big data using the known MapReduce programming model. As core, Apache Hadoop consists of a storage portion, which is known as Hadoop Distributed File System (HDFS).

The term 'columnar' may denote that (data, in particular in a relational database) is not stored in tables with rows but in columns. This may have an access advantage for certain times of operations.

The term 'distributed' may denote that different portions of the data set, or in general different data sets, are not located in the same computing/storage system, but in different computing/storage systems and/or in different locations.

The proposed computer implemented method for enabling data coherency between a first data source and a second data source may offer multiple advantages, contributions and technical effects:

In case an organization maintains different data sets or data assets in different storage systems with different data structures, consistency between the different data assets may be provided even if not only raw data sets are combined but also if derived data assets (which are derived from raw data sets or also from other derived data assets) are combined.

The different data sets or data assets may be stored in completely different storage systems; the data may be structured, semi-structured and/or unstructured data and, may be made consistent and coherent within one data source at different points in time.

The concept of read barriers within the different data sets/data assets and/or related log files may ensure that coherency of derived data assets (that is, those that are a combination of parts of data of originating data sets) across the different storage technologies may be ensured. Data from relational databases, content management systems, and, for example, object data stores may be integrated and consistently reintegrated at a different (later) point in time and still maintain data coherency of an earlier status.

Thus, if data assets are organized as DAG, the proposed concept may still be applied without any restrictions.

It may also not be required to change the way the data are stored in the data sources. The read barriers may be part of the log files (or part of the data source) but they may also advantageously be stored independently of the data source and its related log file. A special storage area for the first read barrier, the second read barrier and/or more read barriers for derived data sources, that is, data assets may be maintained independently of the organization of the original and derived data sources.

This renders the proposed concept very flexible and independent of any data organization. The only fact that is required to be known is a trigger which may be activated if one of the data sources has to have a consistent and coherent status.

Also, the usage of the Kafka system may prove to be advantageous for the proposed concept because the Kafka system is a stream processing software platform which may be well equipped to maintain a stream of read barriers which may itself be organized as a tree structure in order to reactivate or re-examine older read barriers for determining if the required degree of coherency/freshness of the derived data may still be achieved. Thus, the read barriers may be maintained as messaging topics in a stream processing system. Kafka may be one example of other stream processing systems (also denoted as distributed commit log) which may also be used instead of Kafka to support the here proposed concept.

According to a preferred embodiment of the method, a read barrier of the built third data set may be based on the respective read barrier of the first data source and the second data source. In one embodiment, the read barrier values of the first data source and the second data source may refer to identical time stamps and thus, also the read barrier value of the third built data source. In another embodiment, the read barrier values time stamps of the first and the second data source may be different. In that case, the read barrier value of the built third data set may have the later read barrier value time stamp of the first and the second data source. Other rules for deriving the read barrier for the third data set may be applied. In any case, the third data set may also be used as a source for building another, for example, forth, data set also having a read barrier value.

According to a useful embodiment of the method, the first read barrier may be stored in a first dedicated storage, or as part of the first log file. The first dedicated storage may be implemented outside the first log file and/or the first data source. If the first read barrier may be stored as part of the first data source, a dedicated storage area within the first data source may be provided for one or more read barriers indicative of different coherence points or coherence times.

The same may be applicable to the second read barrier. However, in one embodiment, the first read barrier and the second read barrier may share a common storage/memory unit outside the first and the second data source and outside the first and the second log file.

According to one permissive embodiment of the method, the first and/or second data source may be a relational database, a flat file, a content management system, an object store, a Hadoop file system, a NoSQL database. Basically, also other data storage formats may be possible for data of the first and the second data source. In order to use the here proposed method advantageously, it may be practical that the data formats are different or differently organized and stored in the data source. In one embodiment, the only difference may be that they have different coherence points in time, wherein one of the data sources may be a subset of the other one. This may, for example, be the case for local production data (for example, directly determined in a manufacturing machine) and consolidated data warehouse like staging area of a long term manufacturing data store for, for example, quality measurements.

According to one advantageous embodiment of the method, the relational database may be a columnar database (for example, SAP HANA, Sybase IQ, MariaDB, IBM TM1) or a row database, like a traditional relational database. In a columnar database, data tables may be stored column by column rather than row by row. In some application areas the columnar database organization may have advantages, for example, the columnar database may more precisely access the data it needs to answer a query rather than scanning and discarding unwanted data in rows. Query performance may thus be increased for certain workloads.

According to an advantageous embodiment of the method, the third data source may have a different data format if compared to the first data format and the second data format. Thus, there is no need that any two of the involved data source have an identical data structure. This may give the here proposed concept a wide range of application areas.

According to one optional embodiment of the method, the third data source may also have a related log file. Thus, also the third data source may again be used as a source to derive additional subsequent data sources, that is, data assets. Hence, the here proposed method may also support DAG structures of data sources.

According to one advantageous embodiment of the method, as log file system, a Kafka system may be used for the first, the second and/or the third log file. Typically, the Kafka system may be used for all of them. Any version of the Kafka system starting from 0.9.0 may be used. As a reminder, the Kafka system is an Apache Software Foundation open source stream processing software platform. The project aims to provide a unified, high throughput, low latency platform for handling real time data feeds. Its storage layer is essentially a massively scalable pub/sub message queue designed as a distributed transaction log, making it highly valuable for enterprise infrastructures to process streaming data. Kafka can also connect to external systems (for data import/export) via Kafka Connect and provides Kafka Streams, a Java stream processing library. Thus, it should be easily integratable into programming environments of different data sources.

According to an additionally advantageous embodiment of the method, the first and the second data source (optionally also the third data source) may be distributed data sources, for example, within the same data center on different computing/storage systems or around the globe. Hence, the proposed method may be implemented in any data storage environment.

In the following, a detailed description of the figures will be given. All instructions in the figures are schematic. Firstly, a block diagram of an embodiment of the inventive computer implemented method for enabling data coherency between a first data source and a second data source is given. Afterwards, further embodiments, as well as embodiments of the data coherence system for enabling data coherency between a first data source and a second data source, will be described.

FIG. 1 shows a block diagram of a preferred embodiment of the computer implemented method 100 for enabling data coherency between a first data source (which may exemplary be a relational database) and a second data source (which may exemplary be a stream of weather data). As explained above, the first and the second data source or data asset have different structures, like, based on a relational model, an object model, a content management system (CMS), a flat file system, streaming data, data organized as Hadoop data structures, and so on. The method comprises providing, 102 a first data source of a first format and a related first log file which may provide write ahead logging, and providing, 104, a second data source of a second format and a related second log file.

At operation 106, method 100 includes determining a first entry in the first log file at which the data in the first data source have a semantic consistency (for example, consolidated sales figures across region). Operation 108 stores the first entry as a first read barrier. The determination may be user driven or by a specific data consolidation process which may be triggered regularly or according to a threshold value regime. The read barrier itself can be stored within the data source, the log file and/or a dedicated read barrier storage. This may easily allow organizing and storing the read barriers for one or also a plurality of data sources/data assets as a tree structure.

Method 100 also comprises determining a second entry in the second log file 110 at which the data in the second data source have a semantic consistency. Typically, this may happen at a different time than for the first data source which makes it generally difficult to ensure (without any special techniques) to maintain the information and the different data sources coherent.

Method 100 also comprises storing the second entry as a second read barrier 112, and building a third data set derived (that is, a derived data asset) from the first data source or parts of it and the second data source or parts of it, 114, and being coherent with them. The method also uses data from the first data source up to the first read barrier and data from the second data source up to the second read barrier. Also, this determination can be user driven or initiated by a special consolidation process.

FIG. 2 shows a block diagram 200 of a first data source 202 and a second data source 204 which are different in nature and different in data structure. Each of the data sources (at least one of them) is related to log file 202a, 204a. Each of the data sources 202 and 204 may be consistent in itself at some point in time which may be different between the two data sources.

Data asset 206 may be derived from the data sources 202 and 204. However, it may only be used temporarily for analysis purposes and at a later time the data asset 206 may have to be re-created as data asset 208 by using the same consistency points of an earlier time although additional, later consistency points may exist. Hence, the method 100 and/or related system must be enabled to ensure that only consistent data sets of the different data sources are used such that the data asset 206 and 208 may be created/re-created identically.

Another example may make this clear. A first data asset may be a raw data asset from which two derived data sources are generated: the second data asset and the third data asset. These two data assets are themselves combined to create a fourth data asset. There is no guarantee that the version of the first data asset from which the second data asset was derived is the same as that for which the third data asset was combined in order to build the fourth data asset, meaning that the data on the fourth data asset may be incoherent.

Thus, as an example, it may be assumed that the first data set is a ledger of current orders of a company. The second data set may be assumed to be a prediction for future sales of different products in different geographies and, the third data asset may be assumed to be a prediction for the sales of different products for different market segments. Combining the third data asset and the fourth data asset might be misleading if they were not derived from the same version of the first data asset. However, the second data asset and the third data asset may be created by different parts of the organization at different frequencies for different purposes.

Systems, in which a replica of data is stored locally for more efficient access, are called caches. Ensuring the replicated data in the cache reflects the actual data is called maintaining cache coherency. In theory it may be possible to ensure that only a single "golden" replica of a data asset was ever made available for derived data assets. This would ensure that the coherence of all derived data assets but would entail enormous organizational challenges and would be extremely restrictive. Supposed that a replica of the first data set was made available once an hour, then the second data set could also be updated every hour, while the third data set might be updated every day. This is because the computational load is larger and thus less often used. The creator of the fourth data asset could only update the fourth data asset every day in order to ensure coherency, although the preference might be to do it each time a new version of the third data asset is made available. Moreover, the creator(s) of the fourth data set might be prepared to accept some in-coherency as the price for a timely update.

As a further advantage, the inventive concept may allow data sets to be updated at a frequency which may suit them without imposing a global schedule, while allowing derived data assets to compose coherence constraints on their data enrichment process.

FIG. 3 shows a block diagram 300 of the two data sources 202 and 204 (reference FIG. 2) having a different structure with related read barriers. The first data source 202 has been sketched in a table like structure which may suggest that it is, for example, a relational database. The second data source 204 has symbolically been sketched as a spring which may indicate that it is, for example, an object database. It may be noted that the proposed system is completely agnostic to the type of data source.

The data objects 306 (only one of which is marked with a reference numeral) may be content items of a content management system or any other type of object database.

In any case, the core of any of the databases is to use a log file comprising a sequence of every operation that has been performed on the related database. Sometimes it is also called a commit log or a transaction log. If this log file would be infinitely long it would, in principle, be possible to recover any valid historical status of the database from this log along. However, in practice (in particular, if storage is among constrained resources) the log is periodically compacted, meaning that only certain states can be re-created.

It is possible to read these operations from the database log and write them into a replica of the database log which is readable from any location via a standard database agnostic API (application programming interface). The Kafka system is an example of such a distributed commit log. Kafka allows the system to be scaled by partitioning the log such that it can reside on an arbitrary number of machines allowing being written/read in parallel.

Shown storage cells 302 and 304 may represent the first read barrier (relating to the first data source 202) and the second read barrier (relating to the second data source 204). Additional read barriers for the first data source 202 and second data source 204 may exist for other points in time. Thus, the different read barriers (in particular its sequence) may be organized in a tree like structure (not shown).

Typically, in this distributed commit log there is a topic per table (compare Kafka syntax). Each table has a primary key, meaning a row is uniquely identifiable. The messages in the log are the rows in the tables ordered such that messages later in the log represent the more recent states of the rows. In the same way that the database needs to be compacted periodically, also the Kafka topic can be compacted periodically. This means that it can only be a bounded factor larger than the original database table. It may also be worthwhile to note that each message of the Kafka system of a topic has a monotonically increasing offset.

A consumer of a topic knows where in the stream of the topic it is from and which last offset a read operation has been used. In essence, a topic plus an offset represents a version of a database table.

Consistent states of the data sources may always be created during a compacting process. For example, only after the new state of the sales figures for all geographies has been added to the table, the table can be considered to be coherent. For example, imagine at the start of the day the sales figures are (Germany, 100), (France, 50), (Spain 200) and updated figures are added in the database for the next day (Germany 80), (France 70), (Spain 150). The sequence (Germany 100), (France 50), (Span 20), (Germany 80) is not a coherent view of the table because a compacted version would result in (Germany 80), (France 50), (Spain 20). This would combine a new version of Germany with an older version for other countries. However, if the change to the value in Germany was added because the previous value had been a mistake, then it would be a coherent state. Ultimately, the writer of the table determines what is coherent or not and this cannot be determined from the data alone. The proposed concept describes the solution to this fundamental dilemma of data coherency when using different data sources.

Hence, the here proposed concept consists of introducing a marker (that is, read barriers) into the log that allows the writer to define a coherent state. For a raw data asset, this marker is simply the name of the topic and an offset (compare Kafka system syntax). A consumer device of the data is instrumented that it must read up to that marker to get to a coherent state as intended by the writer. This marker is called a read barrier, because the writer of the data uses it to mark the point up to which the reader must read for the state to be valid.

The result of enrichment results in derived data assets that can also be stored in a distributed commit log (that is, a Kafka system). These also implement read barriers in a control topic which indicate the point up to which they need to be read to be consistent, but in addition they put the read barriers of the data assets they used in order to get the enriched form.

As this is applied recursively, the read barrier of a data asset is a tree data structure whose leaves are the read barriers of raw data assets from which everything is derived and whose intermediate nodes are the offset and topics of the derived source creating up to the lower levels in that tree.

In the example mentioned above with three data assets, one might have the most recent read barrier of the second data asset ([DataAsset-1,1000] [DataAsset-2, 50]), while that of the third data asset/DataAsset-3 as ([DataAsset-1, 1500] [DataAsset-3, 100]).

When creating the fourth data asset/DataAsset-4, one might decide that it was not acceptable to create a version where DataAsset-2 was more recent than DataAsset-3, or alternatively one might decide to look for earlier read barriers in which they were coherent. Regardless of the decision, the results of how DataAsset-4 was created would itself be stored in a read barrier, allowing later transformation to determine how acceptable it was.

For completeness reasons, FIG. 4 shows a block diagram of an embodiment of the data coherence system 400 for enabling data coherency between a first data source and a second data source. As mentioned above, the first and the second data source have different structures. System 400 comprising a first data source 202 of a first format and a related first log file (not shown) and a second data source 204 (reference FIG. 2) of a second format and a related second log file.

System 400 comprises a means (in particular, a first determination unit 406) for determining a first entry in the first log file at which the data in the first data source has a semantic consistency and means (in particular, a first storage unit 410) for storing the first entry as a first read barrier, and a means (in particular, a second determination unit 408) for determining a second entry in the second log file at which the data in the second data source have a semantic consistency and a means (in particular, a second storage unit 412) for storing the second entry as a second read barrier. The first and the second determination unit 406, 408 may be implemented as one joined determination unit. Also, the first and second storage unit 410 and 412, for the respective read barriers, may also be implemented as a combined storage unit.

Last but not least, system 400 comprises a means (in particular, a combining module 414 for a joint data pool) for building a third data set derived from data of the first data source and data of the second data source and being coherent with them, using data from the first data source up to the first read barrier and data from the second data source up to the second read barrier.

Embodiments of the invention may be implemented together with virtually any type of computer, regardless of the platform being suitable for storing and/or executing program code. FIG. 5 shows, as an example, a computing system 500 suitable for executing program code related to the proposed method.

Computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand held or laptop devices, multiprocessor systems, microprocessor based systems, set top boxes, programmable consumer electronics, network PCs, minicomputer systems, mainframe computer systems, and distributed cloud computing environments that include any of the above systems or devices, and the like. Computer system/server 500 may be described in the general context of computer system executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in FIG. 5, computer system/server 500 is shown in the form of a general purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is, accessible by computer system/server 500, and it includes both, volatile and non-volatile media, removable and non-removable media.

System memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (for example, a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (for example, at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

Computer system/server 500 may also communicate with one or more external devices 518 such as a keyboard, a pointing device, a display 520, etc.; one or more devices that enable a user to interact with computer system/server 500; and/or any devices (for example, network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (for example, the Internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the data coherence system 400 for enabling data coherency between a first data source and a second data source may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semiconductor system for a propagation medium. Examples of a computer readable medium may include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), DVD and Blu-Ray Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read only memory (ROM), an erasable programmable read only memory (EPROM or Flash memory), a static random access memory (SRAM), a portable compact disk read only memory (CD-ROM), a digital versatile disk (DVD), a memory stick, a floppy disk, a mechanically encoded device such as punch cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction set architecture (ISA) instructions, machine instructions, machine dependent instructions, microcode, firmware instructions, state setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The following paragraphs define some basic terminology.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field programmable gate array (FPGA) based devices, smart phones, personal digital assistants (PDAs), body mounted or inserted computers, embedded device style computers, application specific integrated circuit (ASIC) based devices.

What is claimed is:

1. A computer implemented method (CIM) establishing data coherency between a first data source and a second data source, with the first and the second data source have different structures, the CIM comprising:
   providing a first data source of a first format and a related first log file,
   providing a second data source of a second format and a related second log file,
   determining a first entry in the first log file where there is a semantic inconsistency between the first data source and the first entry of the first log file,
   storing the first entry as a first read barrier,
   determining a second entry in the second log file where there is a semantic inconsistency between the second data source and the second entry of the second log file,
   storing the second entry as a second read barrier, and
   building a third data set derived from data of the first data source and data of the second data source, and being coherent with them, using data from the first data source up to the first read barrier and data from the second data source up to the second read barrier.

2. The CIM according to claim 1, wherein a read barrier of the built third data set is based on the first and second read barriers.

3. The CIM according to claim 1, wherein the first read barrier is stored in at least one of the following locations: a first dedicated storage area, and/or as part of the first log file.

4. The CIM according to claim 1, wherein the second read barrier is stored in at least one of the following locations: a second dedicated storage area, and/or as part of the second log file.

5. The CIM according to claim 1, wherein the first data source takes one of the following forms: a relational database, a flat file, a content management system, an object store, a Hadoop file system, or a No-SQL database.

6. The CIM according to claim 1, wherein:
   the first data source is a relational database which formatted according to a row and column data structure.

7. The CIM according to claim 1, wherein the third data set has a different data format if compared to the first data format and the second data format.

8. The CIM according to claim 7, wherein the third data set also has a related log file.

9. The CIM according to claim 8, wherein as log file system a Kafka system is used for the first, the second log file or the third log file.

10. The CIM according to claim 1, wherein the first and the second data sources are distributed.

11. A data coherence system for enabling data coherency between a first data source and a second data source, wherein the first and the second data source have different structures, the system comprising:
   first data source of a first format and a related first log file,
   second data source of a second format and a related second log file,
   means for determining a first entry in the first log file at which the data in the first data source have a semantic inconsistency,
   means for storing the first entry as a first read barrier,
   means for determining a second entry in the second log file at which the data in the second data source have a semantic inconsistency,
   means for storing the second entry as a second read barrier, and
   means for building a third data set derived from data of the first data source and data of the second data source, and being coherent with them, using data from the first data source up to the first read barrier and data from the second data source up to the second read barrier.

12. The data coherence system according to claim 11, also comprising storage means for storing the first read barrier in a first dedicated storage, or as part of the first log file.

13. The data coherence system according to claim 11, also comprising storage means for storing the second read barrier in a second dedicated storage, or as part of the second log file.

14. The data coherence system according to claim 11, wherein the first and/or second data source is a relational database, a flat file, a content management system, an object store, a Hadoop file system, a No-SQL database.

15. The data coherence system according to claim 14, wherein the relational database is a columnar or a row database.

16. The data coherence system according to claim 11, wherein the third data set has a different data format if compared to the first data format and the second data format.

17. The data coherence system according to claim 16, wherein the third data set also has a related log file.

18. The data coherence system according to claim 17, wherein as log file system a Kafka system is used for the first, the second log file or the third log file.

19. A computer program product (CPP) comprising:
a set of storage device(s); and
computer code stored collectively in the set of storage device(s), with the computer code including data and instructions to cause a processor(s) set to perform at least the following operations:
 providing a first data source of a first format and a related first log file,
 providing a second data source of a second format and a related second log file,
 determining a first entry in the first log file where there is a semantic inconsistency between the first data source and the first entry of the first log file,
 storing the first entry as a first read barrier,
 determining a second entry in the second log file where there is a semantic inconsistency between the second data source and the second entry of the second log file,
 storing the second entry as a second read barrier, and
 building a third data set derived from data of the first data source and data of the second data source, and being coherent with them, using data from the first data source up to the first read barrier and data from the second data source up to the second read barrier.

20. The CPP of claim 19 further comprising:
the processor(s) set;
wherein the computer program product is in the form of a system.

* * * * *